USO10139246B1

(12) United States Patent
Reddy et al.

(10) Patent No.: US 10,139,246 B1
(45) Date of Patent: Nov. 27, 2018

(54) ENHANCED VERTICAL PATH (VPATH) INHIBIT LOGIC FOR VERTICAL SITUATION DISPLAY (VSD)

(71) Applicant: Rockwell Collins, Inc., Cedar Rapids, IA (US)

(72) Inventors: Bandi Bharat Kumar Reddy, Marion, IA (US); Ellen L. McGaughy, Cedar Rapids, IA (US); Timothy J. Geels, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 59 days.

(21) Appl. No.: 15/372,009

(22) Filed: Dec. 7, 2016

(51) Int. Cl.
*G01C 23/00* (2006.01)

(52) U.S. Cl.
CPC .................................. *G01C 23/00* (2013.01)

(58) Field of Classification Search
None
See application file for complete search history.

(56) References Cited

U.S. PATENT DOCUMENTS

| | | | | |
|---|---|---|---|---|
| 3,758,765 | A * | 9/1973 | Vietor | G01C 23/00 235/61 NV |
| 6,154,151 | A | 11/2000 | McElreath et al. | |
| 8,886,369 | B2 | 11/2014 | Sharkany et al. | |
| 9,561,868 | B2 * | 2/2017 | Bourret | B64C 13/18 |
| 2004/0044446 | A1 * | 3/2004 | Staggs | G05D 1/0676 701/16 |
| 2010/0324812 | A1 * | 12/2010 | Sacle | G01C 21/00 701/467 |
| 2011/0301842 | A1 * | 12/2011 | Krupansky | G01C 21/00 701/411 |
| 2014/0257601 | A1 * | 9/2014 | Home | B64D 45/00 701/16 |
| 2015/0262490 | A1 * | 9/2015 | Deker | G08G 5/0052 701/3 |
| 2016/0063867 | A1 * | 3/2016 | Zammit | G08G 5/0039 701/18 |

(Continued)

OTHER PUBLICATIONS

Michael LaMarr, Dr. Nhut Ho, Dr. Walter Johnson, Vernol Battiste, & Joe Biviano,. "Enhancing Pilot Ability to Perform CDA With Descriptive Waypoints" Oct. 16-20, 2011, 30th Digital Avionics Systems Conference.*

(Continued)

*Primary Examiner* — Mussa A Shaawat
*Assistant Examiner* — Abdhesh K Jha
(74) *Attorney, Agent, or Firm* — Angel N. Gerdzhikov; Donna P. Suchy; Daniel M. Barbieri (57) ABSTRACT

A system and related method for enhancing situational awareness by providing, via a vertical situation display (VSD), real time feedback to the pilot when the vertical path (VPATH) of the aircraft diverges or deviates from its desired trajectory. The VSD may display the divergent trajectory to the pilot as well as advise whether the divergence from the desired VPATH can be recovered without exceeding the performance parameters of the aircraft. If the divergence is recoverable, the VSD may display a suggested recovery trajectory and recovery speed associated with reacquiring the desired VPATH based on the performance characteristics of the aircraft.

15 Claims, 7 Drawing Sheets

(56) References Cited

U.S. PATENT DOCUMENTS

2016/0229554 A1* 8/2016 Kawalkar ............ G01C 23/005
2017/0168658 A1* 6/2017 Lacko ................... G06F 3/0481

OTHER PUBLICATIONS

Thomas Prevot, A Display for Managing the Vertical Flight Path—an Appropriate Task with Inappropriate Feedback, HCI-Aero '98—International Conference on Human-Computer Interaction in Aeronautics, Montreal, Canada, Jan. 1998, 7 pages.

* cited by examiner

ENHANCED VERTICAL PATH (VPATH) INHIBIT LOGIC FOR VERTICAL SITUATION DISPLAY (VSD)

BACKGROUND

Current avionics display systems (e.g., "glass cockpits") may incorporate a vertical situation display (VSD) that reduces the cognitive demand on the pilot or crew by displaying vertical situation information of an aircraft from multiple sources in a single display, so that the pilot need not observe this information from diverse displays or panels and in diverse formats. While the avionics display system may graphically display position information of the aircraft relative to its x- and y-axes, the VSD may relieve the pilot of the need to mentally process, translate, or visualize z-axis altitude or vertical distance information. For example, based on altitude or vertical distance information from an onboard air data system (ADS), radar altimeter, or global navigation satellite system, the VSD may display a vertical position of the aircraft, relative to surface terrain or defined waypoints over which the aircraft must maintain a particular vertical path (VPATH), e.g., while proceeding along an instrument approach assigned by air traffic control. However, the VSD may not provide the pilot with feedback as to how closely the aircraft's actual VPATH converges or diverges from its assigned VPATH. Similarly, in the event of a VPATH that diverges from the assigned VPATH, the VSD may not provide guidance to the pilot as to what actions must be taken to restore a divergence from the assigned VPATH.

SUMMARY

Embodiments of the inventive concepts disclosed herein are directed to a system and related method for enhancing situational awareness by providing, via a vertical situation display (VSD), graphical feedback to the pilot when the vertical trajectory of the aircraft diverges from its desired or assigned trajectory. The VSD may advise the pilot whether, and how, a divergence from the desired VPATH may be recovered.

In one aspect, embodiments of the inventive concepts disclosed herein are directed to an avionics system incorporating a VSD. The system may include a flight management system (FMS) that receives regular vertical distance information of an aircraft via one or more vertical distance source. The FMS may determine, or receive, a desired vertical trajectory of the aircraft, the desired vertical trajectory including one or more desired vertical paths (VPATH) corresponding to a particular flight segment or waypoint. The FMS may define a vertical containment region proximate to the desired VPATH, and the VSD may display this region to the pilot. Based on the received vertical distance information, the FMS may determine a current vertical position and current vertical trajectory of the aircraft, displaying the vertical position via the VSD. The FMS may determine whether the current trajectory converges with, or diverges from, the desired VPATH and whether the desired VPATH may be recovered from a given divergence. In the event of a recoverable divergence, the FMS will determine the recovery VPATH and the corresponding vertical speed associated with recovering the desired VPATH. The FMS may determine that the desired VPATH is not recoverable based on the aircraft performance limits.

In a further aspect, embodiments of the inventive concepts disclosed herein are directed to a method for enhancing situation awareness via VPATH display. The method may include determining, via an FMS of an aircraft, a desired vertical trajectory including at least one desired VPATH. The method may include displaying, via a VSD of an aircraft, the desired VPATH of the aircraft and a nominal status (e.g., indicating no need for recovery action). The method may include displaying, via the VSD, a vertical containment region associated with a predetermined range surrounding the desired VPATH. The method may include receiving vertical distance information from one or more vertical distance sources via the FMS. The method may include determining, via the FMS, a current vertical position (e.g., altitude, vertical distance) and a current trajectory of the aircraft. The method may include displaying, via the VSD, the current vertical position. The method may include determining, via the FMS, a convergence, a recoverable divergence, or an unrecoverable divergence of the current trajectory from the desired VPATH. The method may include, in the event of a recoverable divergence, modifying the display of the desired VPATH and vertical containment region to indicate the divergence. The method may include determining, via the FMS, that the desired VPATH is recoverable based on the current trajectory or current position and determining a recovery VPATH and corresponding vertical speed for recapturing the desired VPATH. The method may include displaying, via the VSD, the recovery VPATH, recovery speed, and recoverable status. The method may include determining, via the FMS, that the desired VPATH is unrecoverable and, in the event of an unrecoverable divergence, modifying the display of the desired VPATH and vertical containment region to indicate the unrecoverable divergence.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related method for enhancing situational awareness by providing, via a vertical situation display (VSD), real-time or near-real-time feedback on the convergence or divergence of the current trajectory of the aircraft relative to its desired (assigned) VPATH. In the event of a divergence, the VSD may indicate the magnitude of the divergence and whether recovery action (e.g., restoration of the desired VPATH) is necessary or possible.

Figure 1:
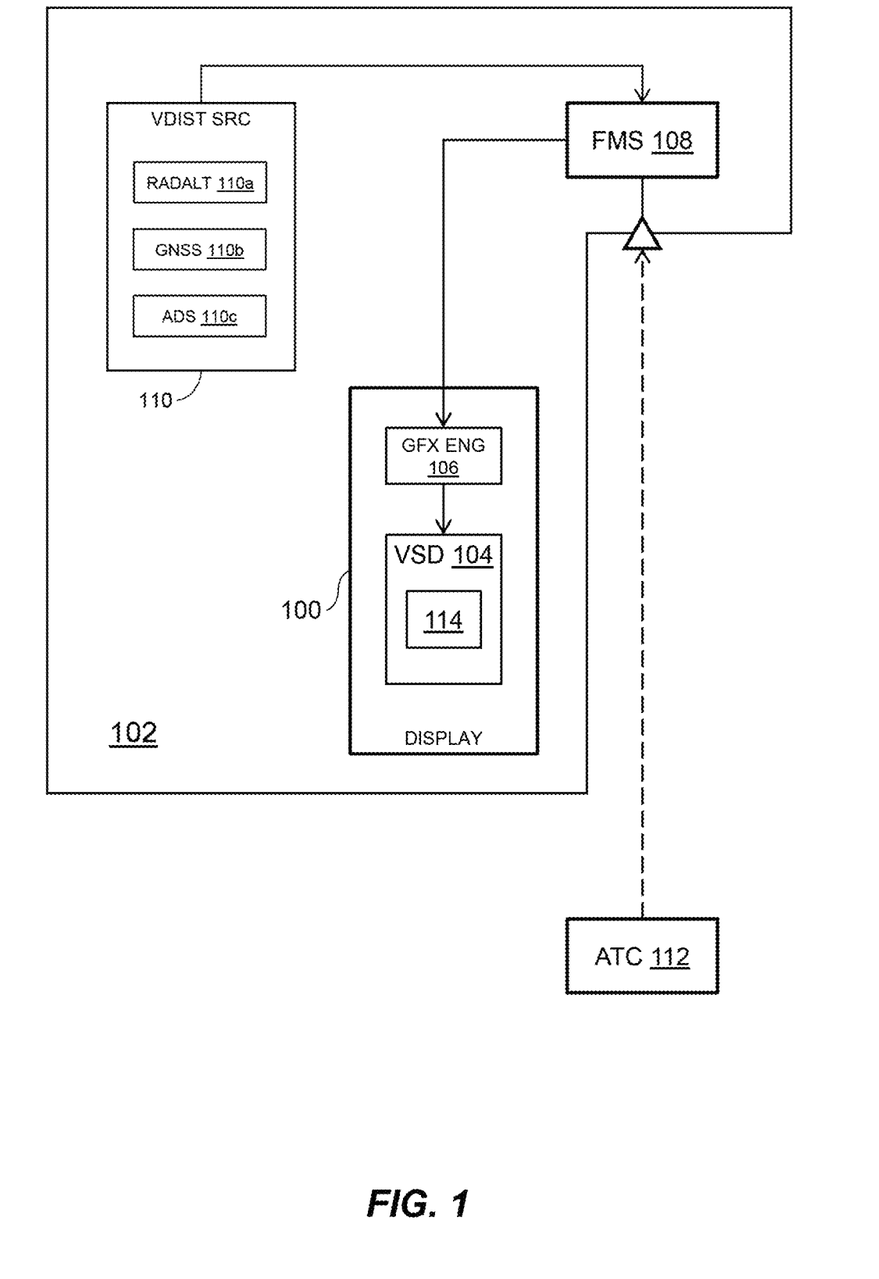
FIG. 1 is a block diagram of an avionics display system incorporating a vertical situation display (VSD) according to the inventive concepts disclosed herein.

Referring to FIG. 2, an avionics display system 100 of an aircraft 102 may include a vertical situation display (VSD) 104. The VSD 104 may include a graphics engine 106 including one or more processors configured for receiving position data processed by a flight management system 108 (FMS, or vertical navigation (VNAV) system) of the aircraft 102. The FMS 108 may receive vertical distance information from vertical distance sources 110 of the aircraft 102. For example, a radar altimeter system 110a (RadAlt) may provide real-time data on the height of the aircraft 102 above the terrain over which the aircraft is currently passing. A global navigation satellite system 110b (GNSS; e.g., Global Positioning System (GPS), GLONASS, COMPASS) may provide height information based on signals received from GNSS satellites. An air data system 110c (ADS) may provide barometric altitude data sensed by a pilot-static system of the aircraft 102.

The FMS 108 may include processors configured to determine a desired vertical trajectory of the aircraft 102 and, based on the received vertical distance information, compare the actual vertical position and vertical trajectory of the aircraft 102 to its desired, or intended, trajectory. The FMS 108 may receive a desired vertical trajectory in the form of a flight plan or approach generated and transmitted by an air traffic control (ATC) facility 112, e.g., a nearby airport or facility at which the aircraft 102 is on approach for landing. A flight plan received by the FMS 108 may include one or more flight segments, from the initial takeoff and climb of the aircraft 102 from its originating airport to its approach and landing procedures proximate to the ATC 112.

Based on the determinations of the FMS 108, the graphics engine 106 may generate relevant imagery, symbology, or iconography displayed to the pilot as output (114) of the VSD 104. The VSD output 114 may comprise a dedicated display surface, or the VSD output 114 may be displayed on a portion (e.g., the lower third, or a portion adjustable by the pilot) of a navigation display surface of the aircraft 102.

Figure 2A:
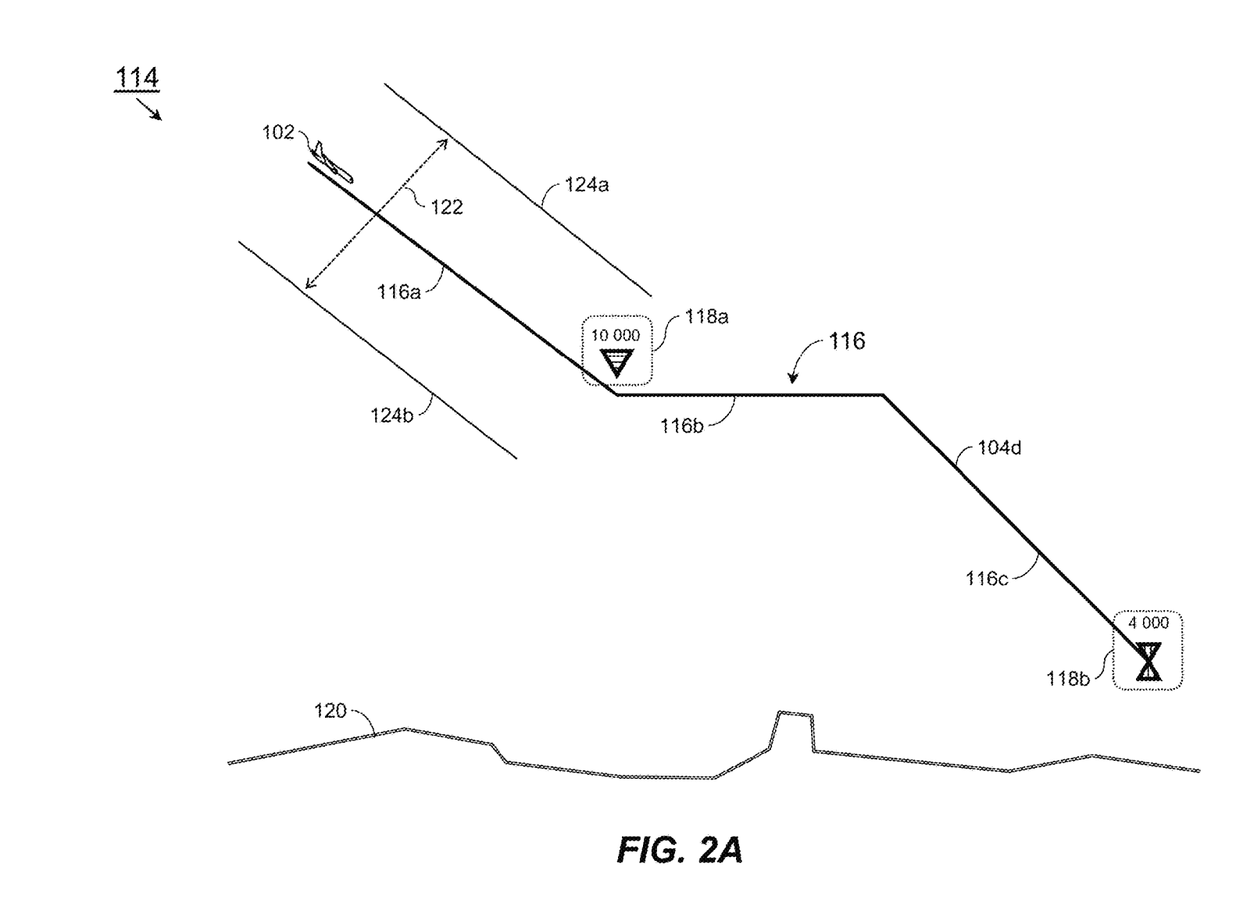
FIG. 2A illustrates output of the VSD of FIG. 1.

Referring to FIG. 2A, the VSD output 114 of FIG. 1 may display the vertical position of the aircraft 102 relative to its desired vertical trajectory 116 as determined, or received, by the FMS 108 (FIG. 1). The desired vertical trajectory 116 may include a sequence of individual desired vertical paths 116a-c (VPATH), each desired VPATH associated with, for example, a particular approach segment or approach waypoint. Each desired VPATH 116a-c may call for the aircraft 102 to descend to, above, or below a specific height above mean sea level (MSL) relative to defined waypoints along the approach path. For example, the desired vertical trajectory 116 of the aircraft 102 may include a first desired VPATH 116a, via which the aircraft 102 should descend at a predetermined rate and angle, proceeding over a first waypoint at or below an altitude of 10,000 feet AGL (e.g., as indicated by the altitude constraint symbol 118a). A second desired VPATH 116b may provide for level flight by the aircraft 102, and a third desired VPATH 116c may provide for a second descent by the aircraft 102, proceeding over a second waypoint precisely at an altitude of 4,000 feet AGL (e.g., as indicated by the altitude constraint symbol 118b).

The VSD output 114 may include a representation of the underlying terrain (120) if, for example, the VSD 104 (FIG. 1) has access to real-time terrain data. This feature may be excluded if the current altitude of the aircraft 102 renders such information irrelevant. The VSD output 114 may include a vertical containment region 122 corresponding to a predetermined range around, or separation from, the desired VPATH 116a. The limits of the vertical containment region 122 may be indicated by upper and lower rails 124a, 124b; for example, the upper and lower rails 124a, 124b may be displayed at a particular range, e.g., 75 feet, 500 feet, or any other predetermined range above and below the desired VPATH 104.

While the vertical position of the aircraft 102 is in a nominal state, e.g., when the vertical position or the current trajectory of the aircraft is aligned or convergent with the desired VPATH 116a, the VSD output 114 may indicate the nominal status by displaying the desired vertical trajectory 116 (and desired VPATHs 116a-c) in a color or state characteristic of the nominal status, e.g., as a solid green line. Similarly, the upper and lower rails 124a-b of the vertical containment region 122 may appear in the VSD output 114 as solid lines of a predetermined color (e.g., magenta), indicating the nominal status.

Figure 2B:
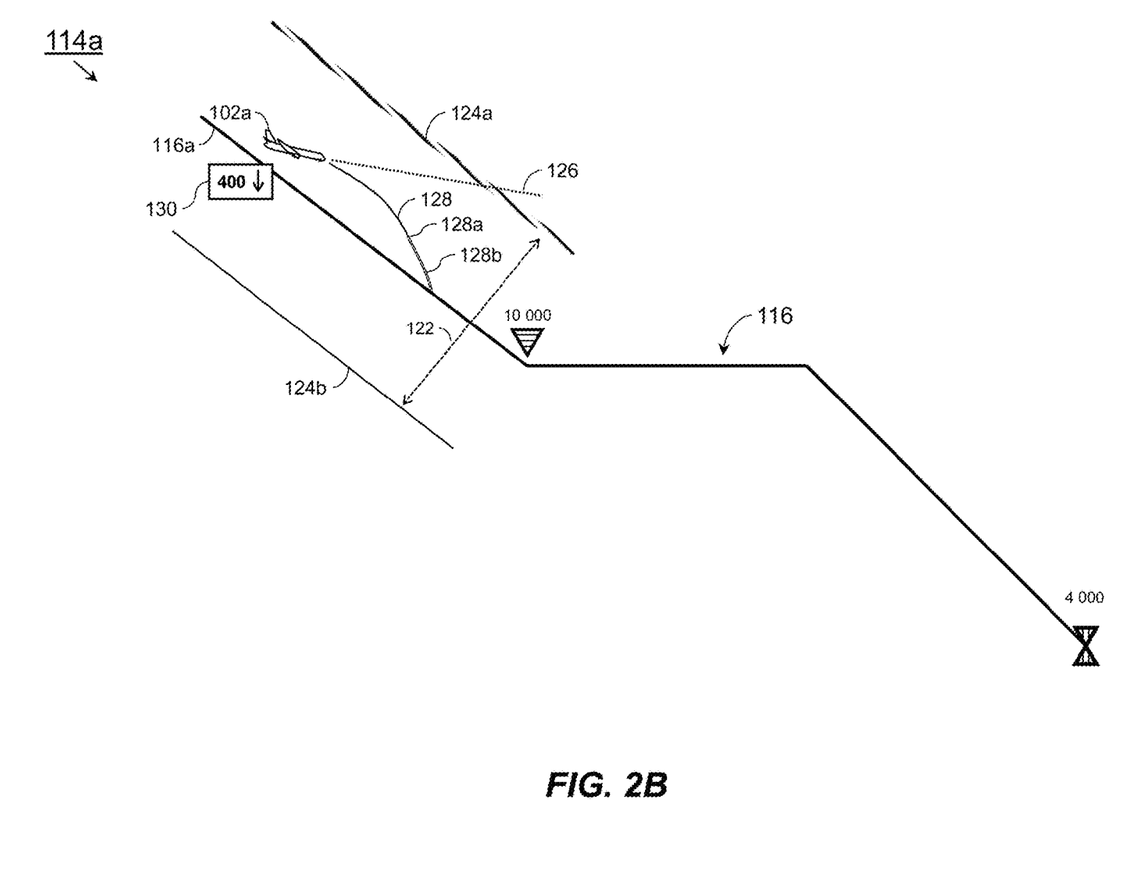
FIGS. 2B and 2C illustrate the output of FIG. 2A in response to a recoverable deviation.

Referring to FIG. 2B, the VSD output 114a may be implemented and may function similarly to the VSD output 114 of FIG. 2A, except that the VSD output 114a may indicate an inhibited mode, or a deviation from the desired VPATH 116a, of the aircraft 102 (FIG. 2A). For example, the FMS 108 (FIG. 1) of the aircraft 102 may determine that the aircraft has deviated from its desired VPATH 116a in an upward direction (e.g., actual altitude>desired altitude). The VSD output 114a may indicate the divergent vertical position of the aircraft (102a) relative to the desired VPATH 116a. The FMS 108 may compare the divergent vertical position 102a and the current trajectory (126) of the aircraft 102 and determine that the desired VPATH 116a is recoverable by the aircraft 102, determining a recovery trajectory (128) and a corresponding recovery vertical speed (130) by which the aircraft 102 can recapture the desired VPATH 116a. In other words, the FMS 108 may determine that the aircraft 102 may proceed from its divergent vertical position 102a along the recovery trajectory 128 at a corresponding recovery vertical speed 130 (e.g., 400 feet per minute (fpm)) while remaining within the performance parameters of the aircraft 102, substantially reacquiring the desired VPATH 116a at a point (128a) indicated by a reacquisition trajectory (128b). The FMS 108 may determine the point (128a) of transition between the recovery trajectory 128 and the reacquisition trajectory 128b based on the particular performance parameters or characteristics of the aircraft 102. The VSD output 114a may further indicate the inhibited or recoverable status (as opposed to, for example, the nominal status shown by the VSD output 114a of FIG. 2A) by displaying the desired vertical trajectory 116 and each individual desired VPATH (116a) in a color or state associated with the inhibited or recoverable status. For example, the desired VPATH 116a and current trajectory (e.g., the path of the aircraft 102a if no further action is taken) may be displayed as yellow or amber paths, associating the inhibited state with caution (but not alarm). Similarly, the VSD output 114a may indicate the recovery or reacquisition trajectories 128, 128b and the recovery vertical speed 130 in a color or state associated with their respective recoverable or reacquisition statuses. For example, the recovery trajectory 128 may be displayed as a solid blue vertical path up to the point (128a) of reacquisition, and the reacquisition trajectory 128b and recovery vertical speed 130 displayed in green. Similarly, the VSD output 114a may indicate the divergent vertical position 102a of the aircraft 102 by modifying the display of the upper rail (124a) of the vertical containment region 122 to indicate the upward divergence of the aircraft 102, e.g., displaying the upper rail 124a as a flashing line.

Figure 2C:
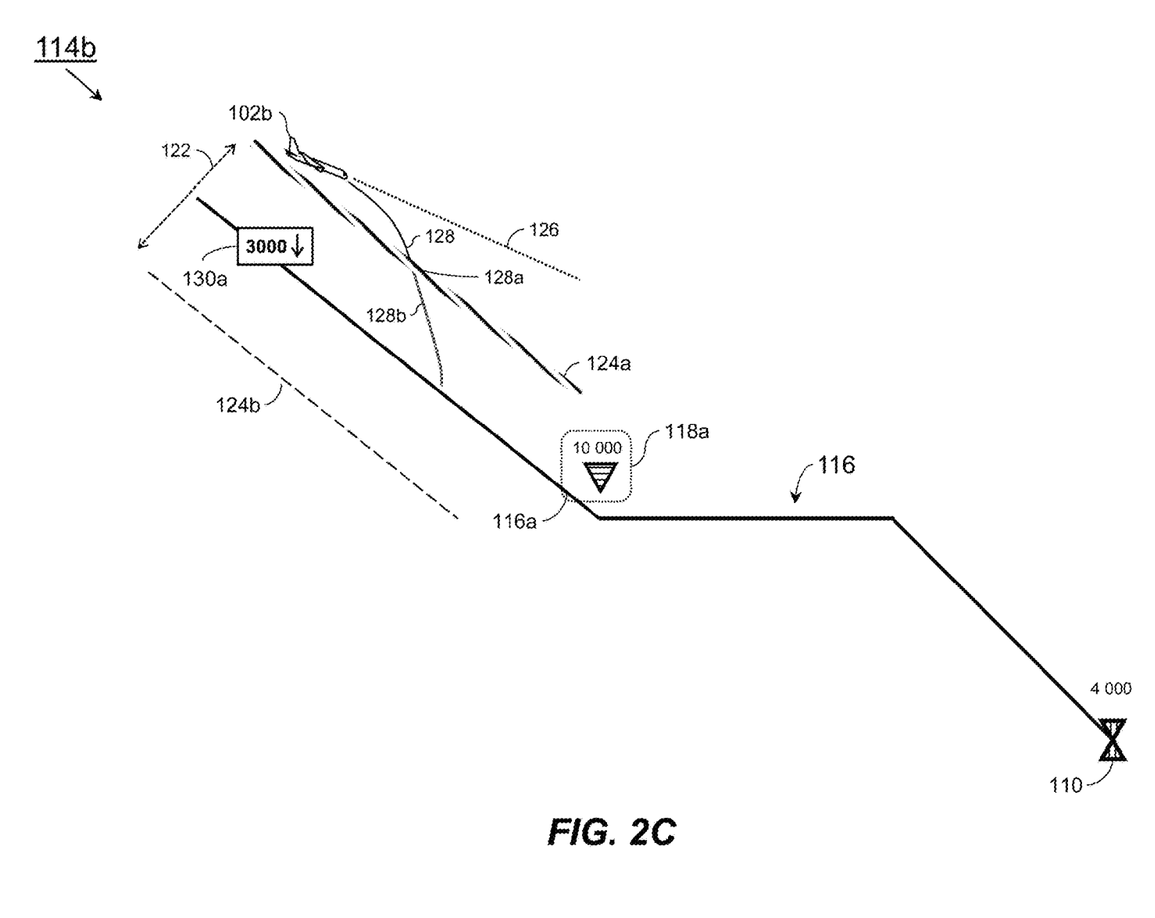

Referring also to FIG. 2C, the VSD output 114b may be implemented and may function similarly to the VSD output 114a of FIG. 2B, except that the VSD output 114b may indicate a divergent vertical position (102b) of the aircraft 102 (FIG. 2A) above the upper rail 124a and thus outside the vertical containment region 122. However, depending on the location of the next waypoint (118a) along the desired vertical trajectory 116, the desired VPATH 116a may still be recoverable by the aircraft 102. Similarly to the VSD output 114a of FIG. 2B, the VSD output 114b may indicate the current trajectory 126 and the appropriate recoverable and reacquired statuses by displaying a recovery trajectory 128 to the point 128a (which may coincide with the upper rail 124a), a reacquisition trajectory 128b, and a corresponding recovery vertical speed 130a (e.g., 3000 fpm) by which the aircraft 102 may, from its divergent vertical position 102b, recapture the desired VPATH 116a and fulfill the desired vertical trajectory 116 by passing over the waypoint 118a at or below 10,000 feet AGL.

Figure 2D:
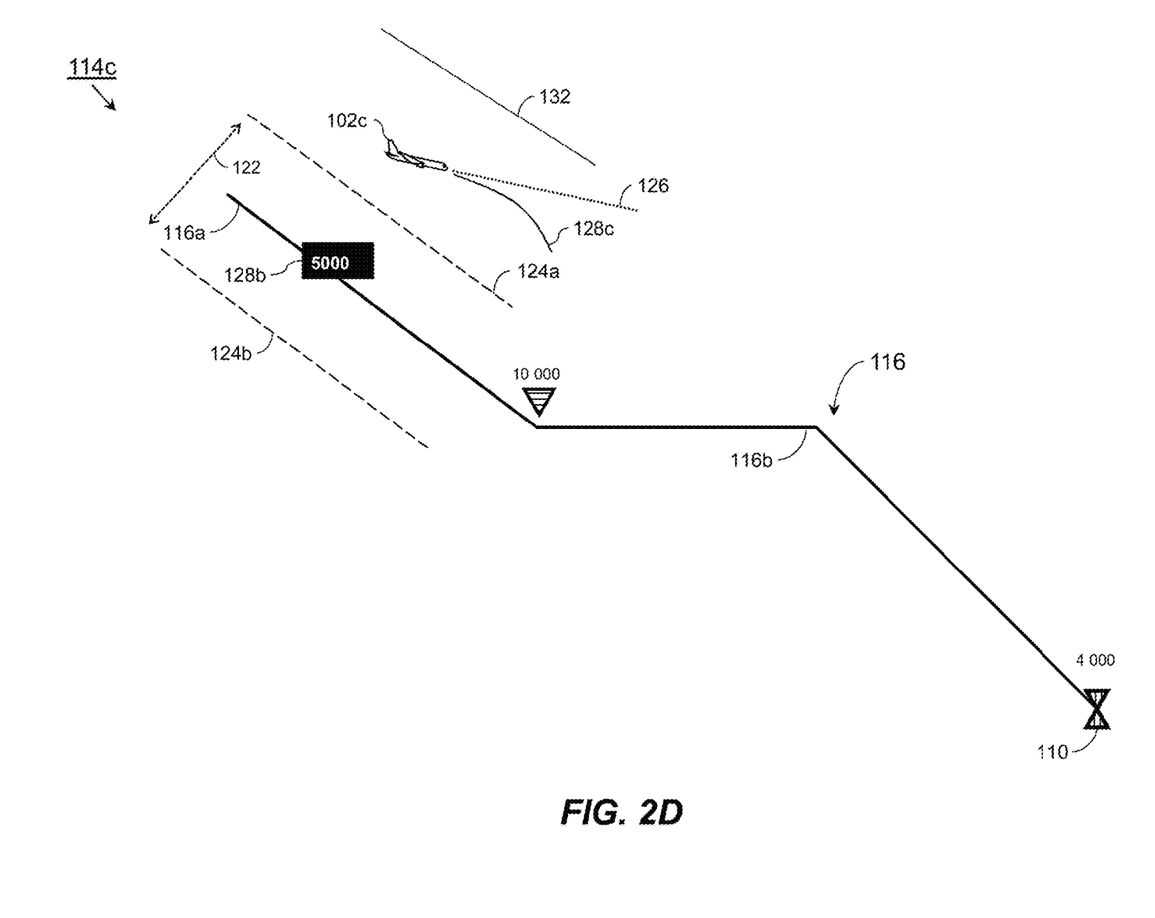
FIG. 2D illustrates the output of FIG. 2A in response to an unrecoverable deviation.

Referring to FIG. 2D, the VSD output 114c may be implemented and may function similarly to the VSD output 114 of FIG. 2A, except that the VSD output 114c may indicate an unrecoverable divergence of the aircraft 102 (FIG. 2A) from the desired VPATH 116a. For example, the FSM 108 (FIG. 1) may determine a divergent vertical position (102c) of the aircraft 102 corresponding to its current trajectory 126. While the FMS 108 may determine that recapture of the desired VPATH 116a is theoretically possible, the corresponding recovery path (128c) and recovery vertical speed (130b) (e.g., 5000 fpm) may exceed the performance parameters of the aircraft 102. The VSD output 114c may indicate the unrecoverable status by displaying the upper and lower rails 124a, 124b of the vertical containment region 122 in a state associated with the unrecoverable status (e.g., as dashed lines) and by displaying the recovery path 126b and recovery vertical speed 128b in a state associated with the unrecoverable status (e.g., in an advisory color such as yellow or amber).

Figure 3A:
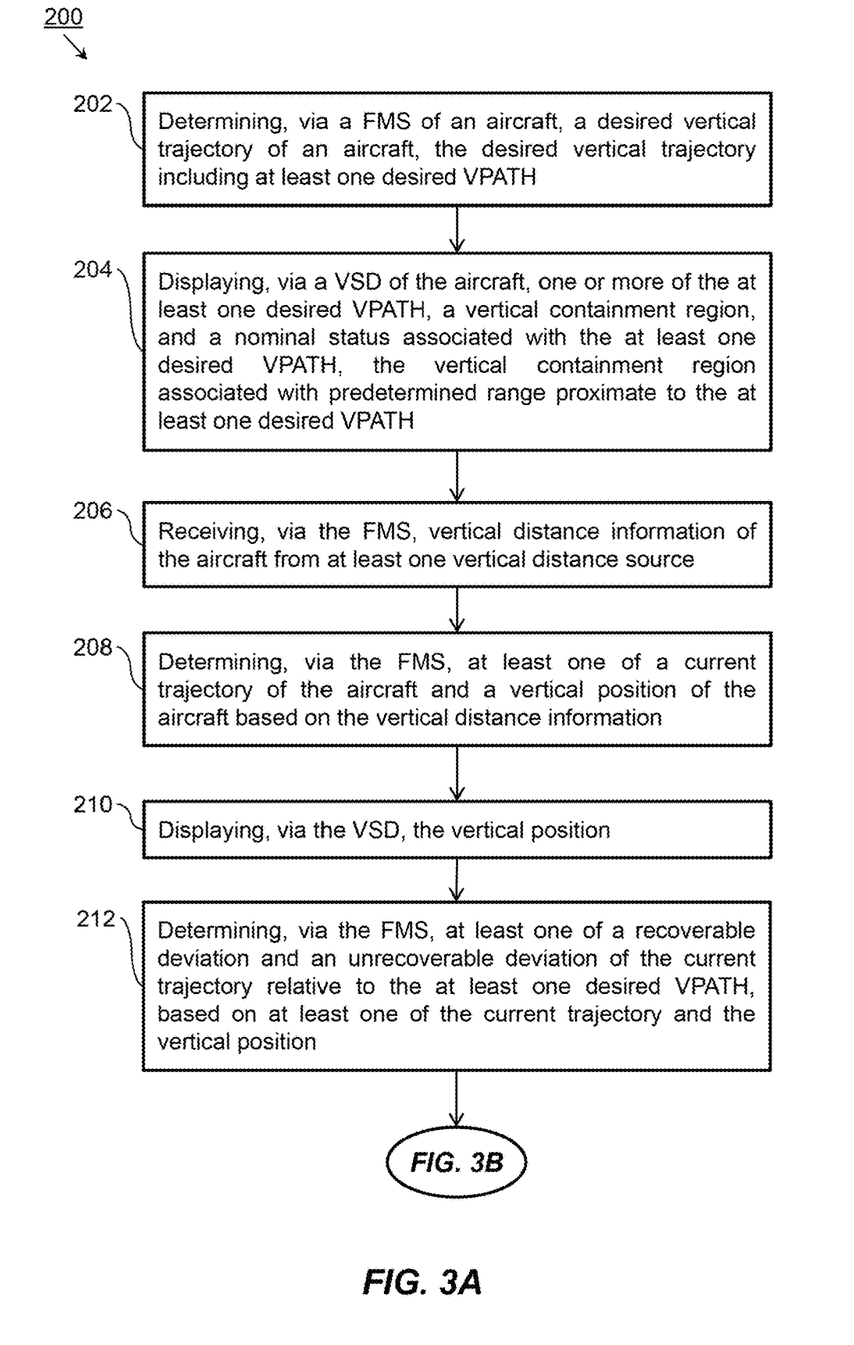
FIGS. 3A and 3B illustrate an exemplary embodiment of a method for enhancing situational awareness via VPATH display according to the inventive concepts disclosed herein.
Figure 3B:
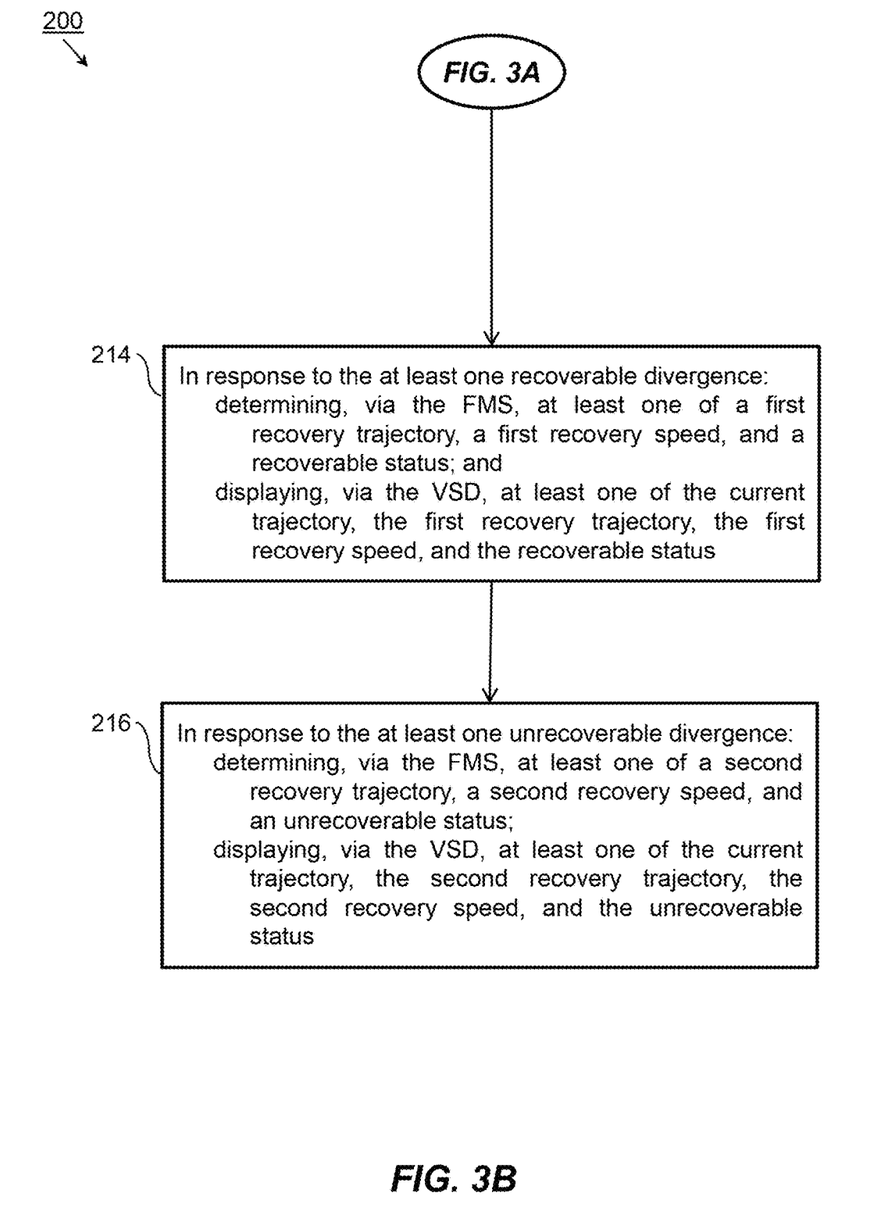

Referring now to FIGS. 3A and 3B, an exemplary embodiment of a method 200 for enhancing situational awareness via vertical path (VPATH) display according to the inventive concepts disclosed herein may be implemented by the avionics display system 100 in some embodiments, and may include one or more of the following steps.

Referring particularly to FIG. 3A, at a step 202 an aircraft FMS determines a desired vertical trajectory of the aircraft, the desired vertical trajectory including at least one desired VPATH.

At a step 204, a VSD of the aircraft displays the at least one desired VPATH, a vertical containment region corresponding to a predetermined range surrounding (or a predetermined separation from) the desired VPATH, and a nominal status.

At a step 206, the FMS receives vertical distance information of the aircraft from one or more vertical distance sources.

At a step 208, the FMS determines a current trajectory and a current vertical position of the aircraft based on the received vertical distance information.

At a step 210, the VSD displays the determined vertical position relative to the desired VPATH.

At a step 212, the FMS determines a convergence, a recoverable divergence, or an unrecoverable divergence of the current trajectory relative to the desired VPATH, based on the current trajectory and the actual vertical position.

Referring now to FIG. 3B, at a step 214, in response to a determined recoverable divergence, the FMS determines a recovery speed and recovery trajectory achievable under the performance parameters of the aircraft (e.g., recoverable), and the VSD displays the current trajectory as well as the recovery speed and recovery trajectory consistent with the recoverable status. For example, the current trajectory may be displayed in yellow or amber. The recovery speed may be displayed in green to indicate the recoverable status, and the recovery trajectory may be displayed in blue (indicating the recovery trajectory to the point of reacquisition) and green (indicating a substantial reacquisition of the desired VPATH).

At a step 216, in response to a determined unrecoverable divergence, the FMS determines a recovery speed and recovery trajectory not achievable under the performance parameters of the aircraft (e.g., unrecoverable), and the VSD displays the current trajectory, the recovery speed, and the recovery trajectory consistent with the unrecoverable status. For example, the unrecoverable trajectory and vertical speed may be displayed in amber (or a like advisory color), indicating that the desired VPATH cannot be reacquired.

As will be appreciated from the above, systems and methods according to embodiments of the inventive concepts disclosed herein may enhance situational awareness by providing real-time or near-real-time intuitive feedback on the convergence or divergence of the current trajectory of the aircraft relative to its desired VPATH. In the event of a deviation or divergence, the VSD may indicate the magnitude of the divergence and whether recovery action is necessary or possible.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. An avionics system incorporating a vertical situation display (VSD), comprising:
   a flight management system (FMS) including at least one processor configured to:
   receive vertical distance information of the aircraft from at least one vertical distance source;
   determine at least one desired vertical trajectory of the aircraft, the desired vertical trajectory including at least one desired vertical path (VPATH);
   determine a vertical containment region associated with a range proximate to the at least one desired VPATH;
   determine at least one of a current trajectory of the aircraft and a vertical position of the aircraft based on the vertical distance information;
   determine at least one of a convergence, a recoverable deviation, and an unrecoverable deviation of the current trajectory relative to the at least one desired VPATH;
   in response to the at least one convergence, determine a nominal status;
   in response to the at least one recoverable deviation:
   determine at least one of: 1) a first recovery trajectory associated with a recapture of the at least one desired VPATH, 2) a first recovery speed, and 3) a recoverable status;
   in response to the at least one unrecoverable deviation:
   determine at least one of: 1) a second recovery trajectory, 2) a second recovery speed, and 3) an unrecoverable status; and
   a vertical situation display (VSD) coupled to the FMS and configured to:
   display the desired vertical trajectory, the vertical position, and the vertical containment region;
   in response to the at least one convergence, display the nominal status;
   in response to the at least one recoverable deviation, display at least one of the current trajectory, the first recovery trajectory, the first recovery speed, and the recoverable status; and
   in response to the at least one unrecoverable deviation, display at least one of the current trajectory, the second recovery trajectory, the second recovery speed, and the unrecoverable status.

2. The avionics system of claim 1, wherein the VSD is configured to display the nominal status by at least one of:
   displaying the at least one desired VPATH in a first state corresponding to the nominal status; and
   displaying the vertical containment region in a second state corresponding to the nominal status.

3. The avionics system of claim 1, wherein the VSD is configured to display the recoverable status by at least one of:
   displaying the at least one desired VPATH in a third state corresponding to the recoverable status; and
   displaying at least one of the vertical containment region, the first recovery trajectory, and the first recovery speed in a fourth state corresponding to the recoverable status.

4. The avionics system of claim 3, wherein the VSD is configured to display the first recovery trajectory and the first recovery speed in at least one of a first color corresponding to the recoverable status and a second color corresponding to a reacquisition of the at least one desired VPATH.

5. The avionics system of claim 1, wherein the VSD is configured to display the unrecoverable status by displaying at least one of the vertical containment region, the second recovery trajectory, and the second recovery speed in a fifth state corresponding to the unrecoverable status.

6. The avionics system of claim 5, wherein the VSD is configured to display at least one of the second recovery trajectory and the second recovery speed in a third color corresponding to the unrecoverable status.

7. The avionics system of claim 1, wherein the at least one vertical distance source includes at least one of an air data system (ADS), a radar altimeter system, and a global navigation satellite system.

8. The avionics system of claim 1, wherein the VSD is configured to display the vertical containment region by displaying at least one limit of the proximate range, the limit including at least one of an upper limit and a lower limit.

9. A method for enhancing situational awareness via vertical path (VPATH) display, the method comprising:
   determining, via a flight management system (FMS) of an aircraft, a desired vertical trajectory of an aircraft, the desired vertical trajectory including at least one desired vertical path (VPATH);
   displaying, via a vertical situation display (VSD) of the aircraft, one or more of the at least one desired VPATH, a vertical containment region, and a nominal status associated with the at least one desired VPATH, the vertical containment region associated with a predetermined range proximate to the at least one desired VPATH;

receiving, via the FMS, vertical distance information of the aircraft from at least one vertical distance source;

determining, via the FMS, at least one of a current trajectory of the aircraft and a vertical position of the aircraft based on the vertical distance information;

displaying, via the VSD, the vertical position;

determining, via the FMS, at least one of a recoverable deviation and an unrecoverable deviation of the current trajectory relative to the at least one desired VPATH, based on at least one of the current trajectory and the vertical position;

in response to the at least one recoverable deviation:
  determining, via the FMS, at least one of a first recovery VPATH, a first recovery speed, and a recoverable status; and
  displaying, via the VSD, at least one of the current trajectory, the first recovery trajectory, the first recovery speed, and the recoverable status; and in response to the at least one unrecoverable deviation:
  determining, via the FMS, at least one of a second recovery trajectory, a second recovery speed, and an unrecoverable status;
  and
  displaying, via the VSD, at least one of the current trajectory, the second recovery trajectory, the second recovery speed, and the unrecoverable status.

10. The method of claim 9, wherein displaying, via a vertical situation display (VSD) of the aircraft, one or more of the at least one desired VPATH, a vertical containment region, and a nominal status associated with the at least one desired VPATH, the vertical containment region associated with predetermined range proximate to the at least one desired VPATH includes:
  displaying the at least one desired VPATH in a first state corresponding to the nominal status; and
  displaying the vertical containment region in a second state corresponding to the nominal status.

11. The method of claim 9, wherein displaying, via the VSD, at least one of the current trajectory, the first recovery trajectory, the first recovery speed, and the recoverable status includes:
  displaying the at least one desired VPATH in a third state corresponding to the recoverable status; and
  displaying at least one of the vertical containment region, the first recovery trajectory, and the first recovery speed in a fourth state corresponding to the recoverable status.

12. The method of claim 11, wherein displaying at least one of the vertical containment region, the first recovery trajectory, and the first recovery speed in a fourth state corresponding to the recoverable status includes:
  displaying the first recovery trajectory and the first recovery speed in at least one of a first color corresponding to the recoverable status and a second color corresponding to a reacquisition of the at least one desired VPATH.

13. The method of claim 9, wherein displaying, via the VSD, at least one of the current trajectory, the second recovery trajectory, the second recovery speed, and the unrecoverable status includes:
  displaying the vertical containment region in a fifth state corresponding to the unrecoverable status; and
  displaying the second recovery trajectory and the second recovery speed in a third color corresponding to the unrecoverable status.

14. The method of claim 9, wherein the at least one vertical distance source includes at least one of an air data system (ADS), a radar altimeter system, a flight management system, and a global satellite navigation system.

15. The method of claim 9, wherein displaying, via a vertical situation display (VSD) of the aircraft, one or more of the at least one desired VPATH, a vertical containment region, and a nominal status associated with the at least one desired VPATH, the vertical containment region associated with predetermined range proximate to the at least one desired VPATH includes:
  displaying, via a VSD, at least one of an upper limit of the vertical containment region and a lower limit of the vertical containment region.

* * * * *